(No Model.) 5 Sheets—Sheet 1.

J. ELLIS.
THRASHING MACHINE.

No. 336,399. Patented Feb. 16, 1886.

Witnesses:
Henry Bossert
Harry Drury

Inventor:
John Ellis
by his Attorneys
Howson & Son (No Model.) 5 Sheets—Sheet 2.
J. ELLIS.
THRASHING MACHINE.

No. 336,399. Patented Feb. 16, 1886.

Witnesses:
Henry Bossert.
Harry Drury

Inventor:
John Ellis
by his Attorneys
Howson & Son (No Model.)　　　　　　　J. ELLIS.　　　　　5 Sheets—Sheet 3.
THRASHING MACHINE.
No. 336,399.　　　　　　　Patented Feb. 16, 1886.
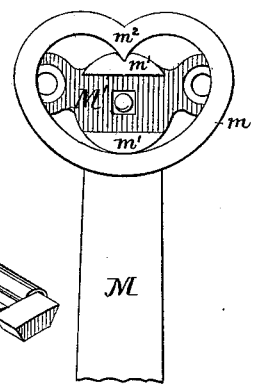
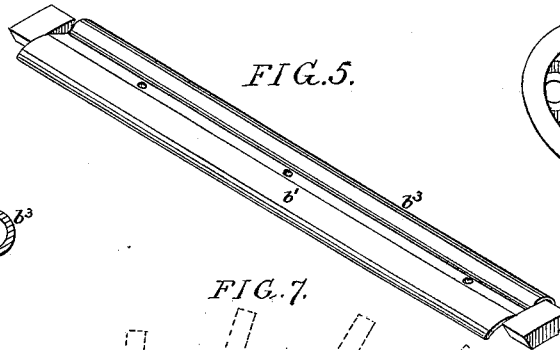
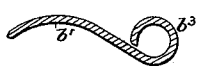
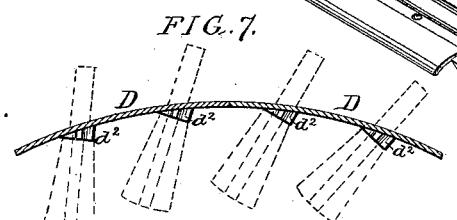
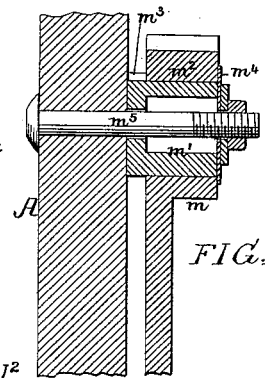
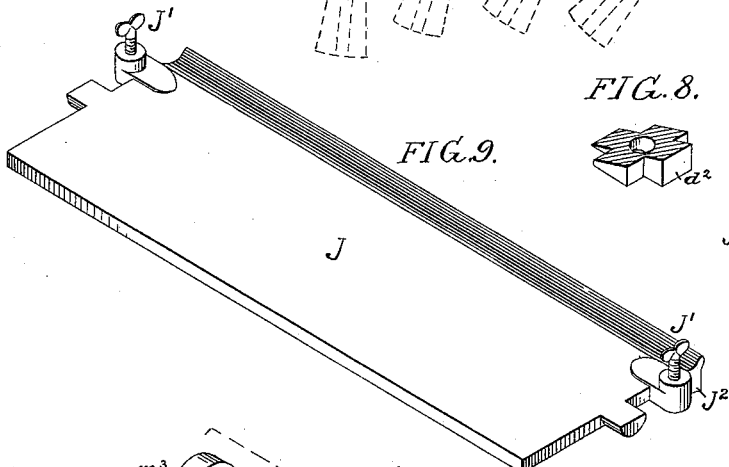
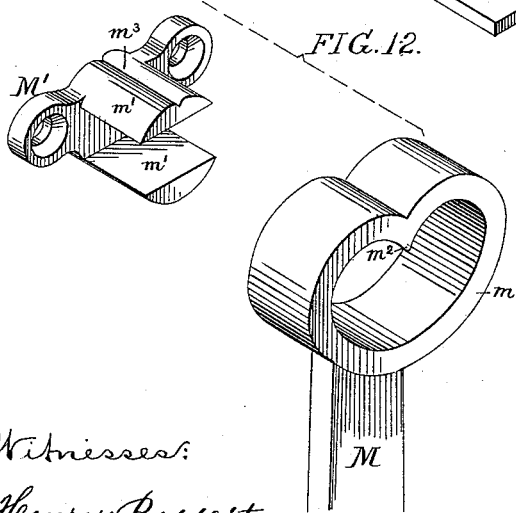
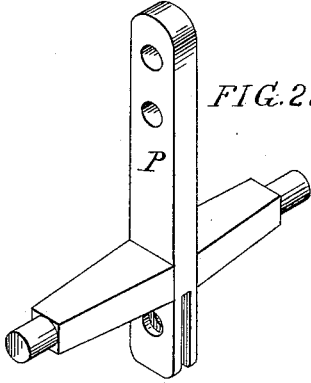
Witnesses:
Henry Bossert
Harry Drury
Inventor:
John Ellis
by his Attorneys (No Model.) 5 Sheets—Sheet 4.
J. ELLIS.
THRASHING MACHINE.
No. 336,399. Patented Feb. 16, 1886.
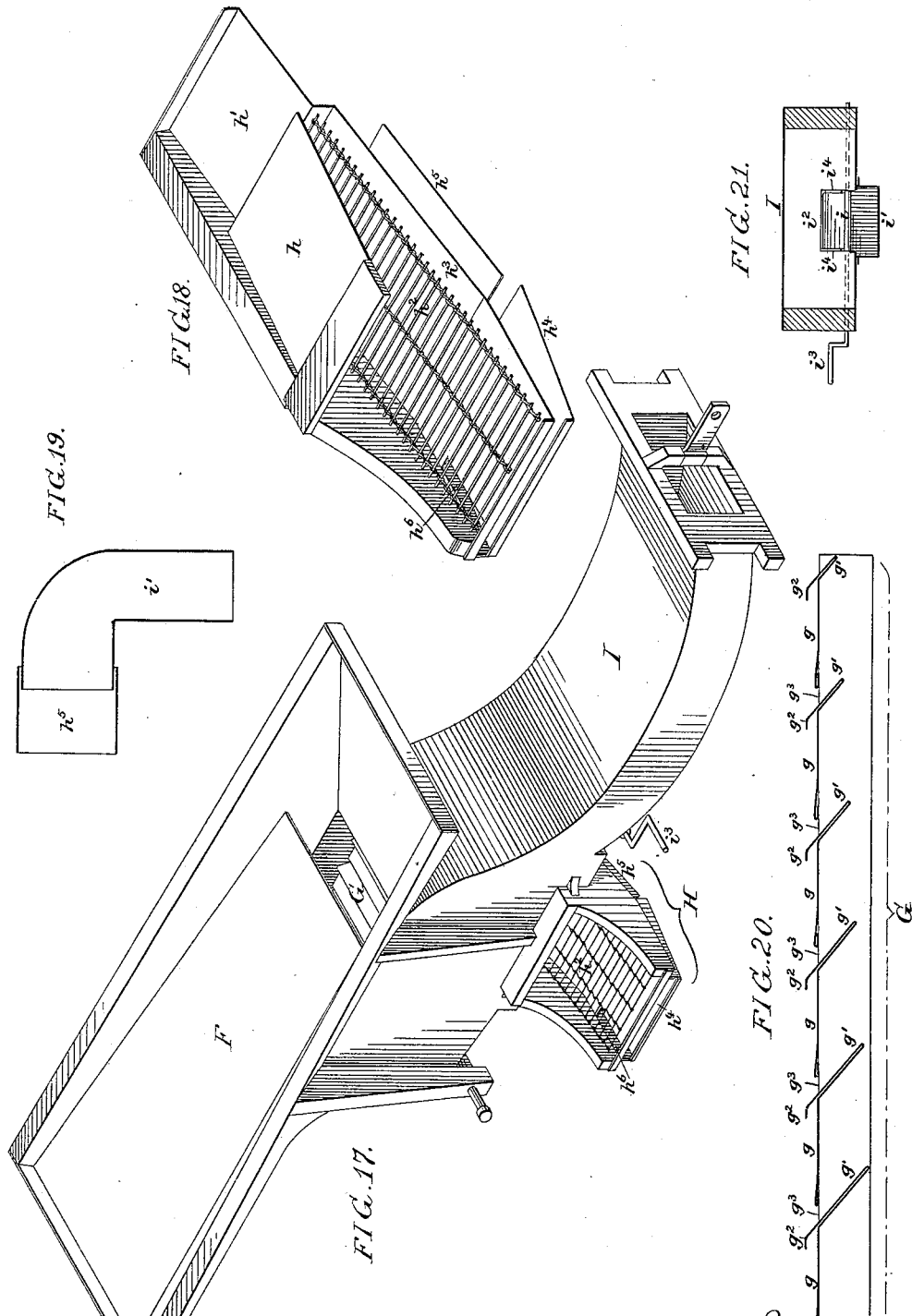
Witnesses:
Henry Bossert
Harry Drury
Inventor
John Ellis
by his Attorneys
Howson & Son (No Model.) 5 Sheets—Sheet 5.

J. ELLIS.
THRASHING MACHINE.

No. 336,399. Patented Feb. 16, 1886.

Witnesses:
Henry Bossert
Harry Drury

Inventor:
John Ellis
by his Attorneys
Howsen King

UNITED STATES PATENT OFFICE.

JOHN ELLIS, OF EAST COVENTRY, PENNSYLVANIA, ASSIGNOR TO GEORGE B. ELLIS, OF SAME PLACE.

THRASHING-MACHINE.

SPECIFICATION forming part of Letters Patent No. 336,399, dated February 16, 1886.

Application filed January 27, 1885. Serial No. 154,149. (No model.)

*To all whom it may concern:*

Be it known that I, JOHN ELLIS, a citizen of the United States, and a resident of East Coventry, Chester county, Pennsylvania, have invented certain Improvements in Thrashing-Machines, of which the following is a specification.

My invention consists of certain details in the construction of a thrashing-machine, the general objects of the improvements being the simple construction and efficient operation of the machine, and the various features of the invention being too fully described and claimed hereinafter to need any specific preliminary mention.

Figure 1:
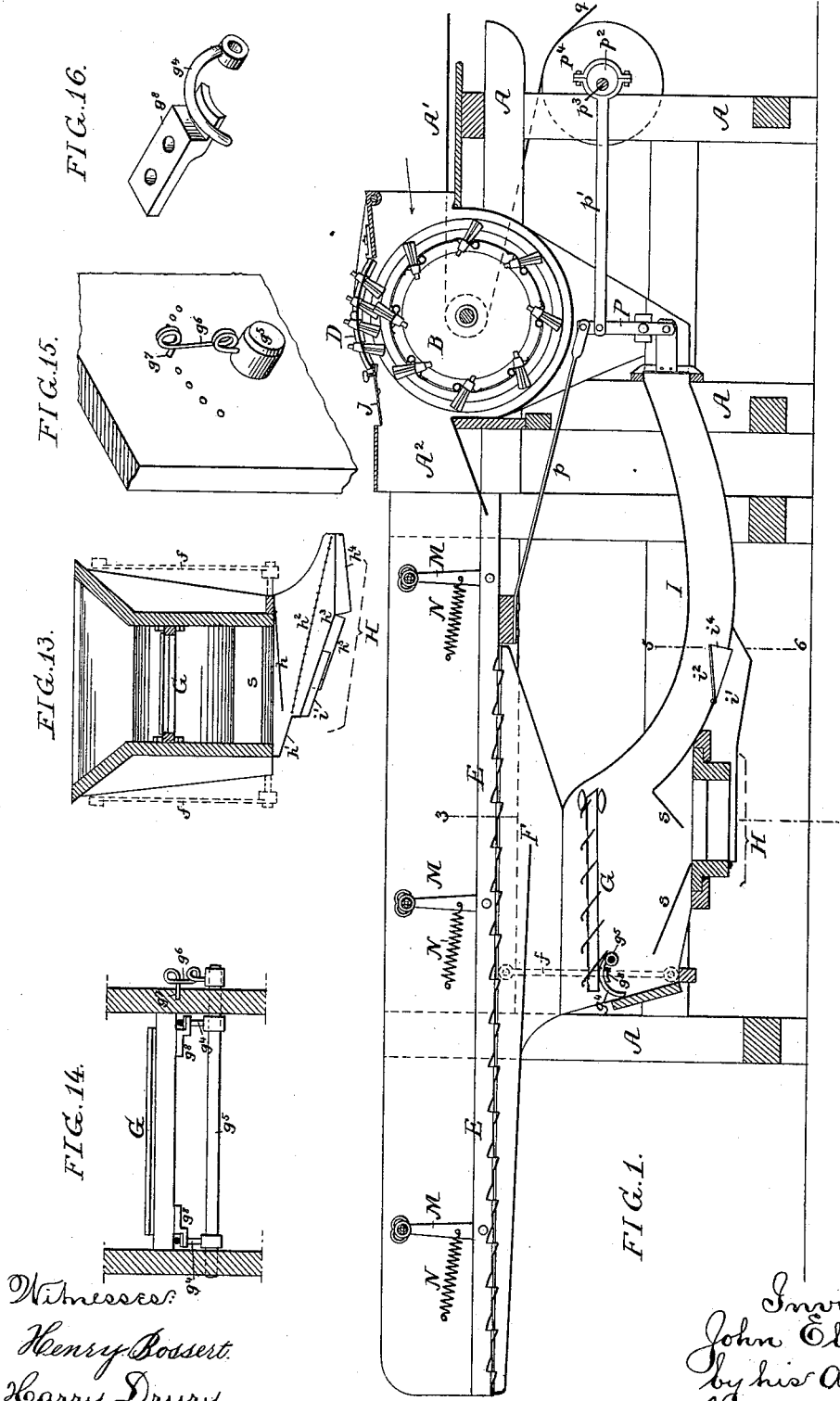
Figure 2:
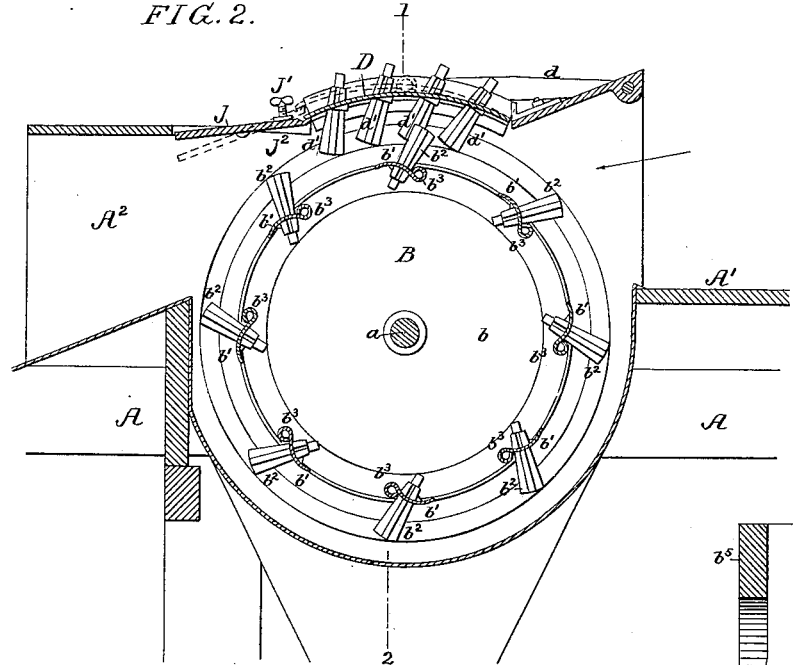
Figure 3:
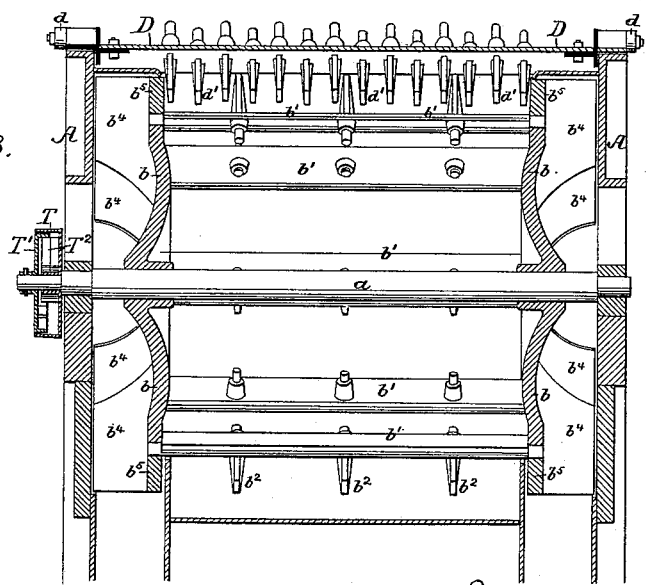
Figure 4:
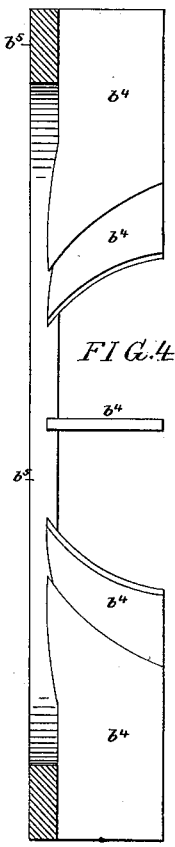
Figure 23:
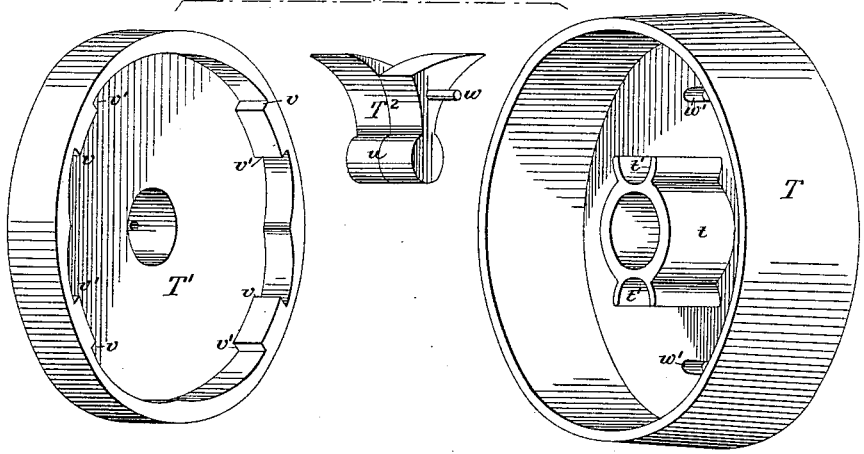

In the accompanying drawings, Figure 1 is a longitudinal section of a thrashing-machine with my improvements; Fig. 2, a section, on a larger scale, of the cylinder, concave, and parts adjacent thereto; Fig. 3, a transverse section of Fig. 2 on the line 1 2; Fig. 4, an enlarged view of the fan carried by the cylinder; Fig. 5, a perspective view of one of the cylinder-bars; Fig. 6, an enlarged section of the same; Fig. 7, a sectional view of the concave with the teeth in dotted lines; Fig. 8, a perspective view of one of the bases for the teeth; Fig. 9, a perspective view of the discharge-regulator and concave support; Figs. 10, 11, and 12, detached views of one of the hangers for the shaking table of the machine; Fig. 13, a transverse section on the line 3 4, Fig. 1, through the shaking table, grain-bottom, and supplementary separator; Figs. 14, 15, and 16, detached views of the device for adjusting the riddle; Fig. 17, a perspective view of the structure comprising grain-bottom, riddle, blast-shoe, and supplementary separator; Fig. 18, a sectional perspective view of said separator; Fig. 19, a sectional plan showing the form of the blast-tapping spout; Fig. 20, an enlarged longitudinal section of the riddle; Fig. 21, a transverse section through the blast-shoe on the line 5 6, Fig. 1, showing the tapping valve and spout; Fig. 22, a perspective view of the lever, whereby the motion is imparted to the shaking table and grain-bottom; and Figs. 23, 24, and 25, detached views of the right and left hand pulley for the cylinder-shaft.

A is the main frame of the machine; B, the cylinder; D, the concave; E, the shaking table; F, the grain-bottom; G, the riddle; I, the blast-shoe, and H the supplementary separator.

The cylinder is composed of the opposite end plates, $bb$, carrying the transverse bars $b'$, and secured to the shaft $a$, which is adapted to turn in suitable bearings on the frame. (See Fig. 3.) Each bar $b'$ carries a series of teeth, $b^2$, which are constructed and are secured to the bar in substantially the same manner as that set forth in my Patent No. 285,595, dated September 25, 1883. The bar itself, however, is made of wrought or malleable iron or steel, and is constructed with reference to the attainment of two objects—first, to prevent the front edge of the bar from striking and forcibly ejecting the straw or chaff, and, second, to insure great strength without unduly increasing the weight or cost of the bar. The first of these objects is attained by depressing the front edge of the bar, as shown in Figs. 1, 2, and 6, so that the portion of the bar which strikes the straw is gently rounded and presents no edge to catch upon or forcibly eject the straw, the second object being attained by simply bending up the rear edge of the bar, so as to form a hollow rib, $b^3$, upon the same.

In order to simplify the construction of the fan at each end of the cylinder, I attach the fan-blades $b^4$ to the ring $b^5$, which confines the bars $b'$ to the heads $b$ of the cylinder. When the ring is cast, the blades may be cast therewith, as shown in Fig. 4, and when the ring is made of wrought metal the blades may be riveted or otherwise secured thereto, so that when the ring is shrunk onto the head, the firm attachment of the blades to said head is insured. The concave D is hung to the frame by arms $d$, and is furnished with teeth $d'$, similar to those shown in the former patent, but the teeth, instead of bearing directly upon a ribbed concave bar, are seated upon lugs or projections $d^2$, on the under side of a segmental concave bar, Fig. 7, the bearing-faces of these lugs being at different angles in respect to the periphery of the cylinder, so that the teeth will assume a gradually-increasing angle from the feed to the discharge end of the machine for the purpose set forth in the aforesaid patent. The lugs $d^2$ are ribbed in the same manner as the shanks of the teeth $d'$, (see Fig. 8,) so that the ribbed surface presented extends completely to the plate of the concave. By the construction shown I avoid the necessity of forming transverse ribs on the concave-plate, as shown in the former patent, as I find that such ribs have a tendency to obstruct the free passage of the material through the machine. A pivoted plate, J, Fig. 9, forms part of the top of the discharge-passage $A^2$, which leads from the cylinder to the shaking table E of the machine, the front edge of this plate supporting the rear edge of the concave D, and being adjustable by means of set-screws $J'$, adapted to bear upon the opposite side frames of the machine. When the front end of the plate J is raised so as to elevate the concave, the rear end of said plate is depressed, as shown by dotted lines in Fig. 2, the area of the discharge-passage being thus contracted, and the straw, chaff, and grain prevented from escaping with more force than when the concave was lowered and offered more resistance to the escape. The plate J has side wings, $J^2$, adjacent to the front edge, in order to prevent the lateral escape of material when said front edge is elevated. The shaking-table E is hung by means of links M to the side bars of the fixed frame, the upper end of each bar having an eye, $m$, for the reception of a stud, $m'$, on a plate, $M'$, secured to the side bar of the frame. The eye $m$ has a knife-edge projection, $m^2$, which is adapted to a groove, $m^3$, in the top of the stud $m'$, the lower portion of the eye bearing against the bottom of said stud, so that while the link is free to swing with very little friction on the stud vertical displacement is effectually prevented. The link is laterally confined to the stud $m'$ by a plate, $m^4$, and bolt $m^5$, a washer bearing against the plate and against a nut on the bolt, as shown in Fig. 11. The stud $m'$ is recessed in the center in order to reduce its weight and accommodate the bolt $m^5$. When the shaking table is at rest, the links M hang vertically, as shown in Fig. 1, and when a longitudinal reciprocation is imparted to the table there must, owing to the arcs of circles in which the lower ends of the links travel, be a lift of the table as it swings rearward, and a corresponding fall as it swings forward again. In an ordinary thrashing-machine this causes uneven wear upon the parts, whereby the shaking movement is imparted to the table, the rearward movement and lift requiring much more force than the forward movement, which is facilitated by the natural tendency of the table and its load to fall. I overcome this objection and equalize the duty of the shaking mechanism by the use of counterbalance-springs N, which tend to raise the table, the power of the springs being such that while they will not of themselves lift the table they will relieve the shaking devices of the greater part of this lifting duty, and will on the other hand counteract the tendency of the table to fall when it has been lifted, so that the movement of the table in one direction will require about as much force as its movement in the opposite direction.

In Fig. 1 of the drawings I have shown the springs N connected to the links M, but they may be applied in other ways for the attainment of the same result, as will be readily understood.

In order to avoid a multiplicity of parts—hangers and shaking devices—I make the grain-bottom F, riddle G, and blast-shoe I in one structure, which is supported at the rear upon the side frames by means of links $f$, and at the front end by the short arm of a lever, P, the latter being hung to suitable bearings on the frame, and the long arm of the lever being connected by a rod, $p$, to the shaking table, and by a rod, $p'$, to an eccentric, $p^2$, on a shaft, $p^3$, at the end of the machine, a pulley, $p^4$, on this shaft being rotated by contact with the driving-belt $q$, as is usual in thrashing-machines. A single lever thus serves as the means of effecting the reciprocation of the shaking-table and grain-bottom structure, the desired differential character of the movements being effected by the difference in the length of the arms of the lever. The blast is derived from the fans, carried by the opposite ends of the cylinder, the blast-spouts communicating with the openings in the front end of the blast-shoe, and the rear end of the latter communicating with the chamber beneath the riddle. The grain, short straw, chaff, &c., which pass through the hooded openings of the shaking table, are directed by the grain-bottom onto the front end or head of the riddle, and in falling onto and passing over the riddle the material is subjected to the influence of the blast, so as to blow off the light impurities and clean the grain.

The riddle-bars are constructed in the manner shown in Fig. 20, each bar consisting in the present instance of a strip of sheet metal bent so as to form the table $g$, with rearwardly and downwardly inclined wing $g'$, and upwardly-projecting lip $g^2$ at the rear end of said table, the front end of each table terminating some distance from the rear end of that in advance, so as to form openings $g^3$ for the passage of the blast and the downward escape of grain. The lips $g^2$ at the rear ends of the bars serve to feed forward the straw, &c., over the riddle, and the rearwardly-inclined wings serve to deflect the air up through the passage $g^3$.

In order that the wings nearest the entrance of the blast-chamber beneath the riddle shall not rob the more distant openings of their proper supply of air, the wings are graduated in depth, that nearest the blast-chamber entrance being shortest, and the wings gradually increasing in depth to the opposite or discharge end of the riddle, the bar at that end having the deepest wing.

In the operation of the machine it frequently becomes desirable to change the angle of the riddle. For instance, the riddle may have a tendency to become clogged, in which case it is desirable to lower the discharge end of the same, in order to permit a more ready escape of the tailings; or, on the other hand, the escape may be so free that grain is carried off with the tailings, in which case the elevation of the discharge end of the riddle is advisable.

In order to effect the desired adjustment I support the outer end of the riddle upon cam-levers $g^4$, carried by a rock-shaft, $g^5$, Figs. 1 and 14, the outer end of which is provided with an elastic arm, $g^6$, having a pin, $g^7$, adapted to any one of a row of segmental openings in the casing of the riddle, as shown in Fig. 15, so that by moving said arm the cam-levers can be operated so as to raise or lower the discharge end of the riddle, and can be locked in position after adjustment.

In order to confine the riddle longitudinally to the levers $g^4$ and prevent lost motion or rattling of the riddle thereon, I secure to the under side of the riddle brackets $g^8$, (see Fig. 16,) which are curved so as to embrace the cam-levers $g^4$, and thus serve to confine the riddle thereto longitudinally as well as vertically, as shown in Figs. 1 and 14. The grain and whatever impurities may fall through the riddle with the same are directed by plates $s\,s$ to the supplementary cleaner and separator, which in this case is arranged transversely to the riddle, although this is not essential, as it may be placed longitudinally beneath the same, if desired. The supplementary separator comprises the upper or guard plate, $h$, guide-plate $h'$, screen $h^2$, collecting-box $h^3$, chute $h^4$, and blast-box $h^5$, as fully shown in Fig. 18. The guard-plate $h$ receives the material from the plates $s\,s$ and serves to prevent short straws or like impurities from falling end on through the meshes of the screen $h^2$, said plate $h$ delivering the material onto the plate $h'$, which directs the same onto the head of the screen. As the material passes over the screen, the grain and small impurities fall through the same into the box $h^3$, the straws and larger impurities passing from the end of the screen onto a chaff-heap. The grain and such impurities as accompany the same pass from the box $h^3$ onto the chute $h^4$, through openings $h^6$ at the sides of the box, and over the head of the chute, down which the material slides while subjected to the influence of the blast from the blast-box $h^5$, this blast separating from the grain and carrying off over the head of the chute whatever impurities may remain with the same, the cleaned grain escaping finally from the end of the chute into a suitable receptacle.

The object of discharging the material from the box $h^3$ and onto the chute $h^4$ at the sides of the latter is to prevent the material from being subjected to the full force of the blast while it is falling onto the chute, as the strength of the blast along the center of the chute is such that it might carry grain with it over the head of the chute and onto the chaff-heap.

Figure 24:
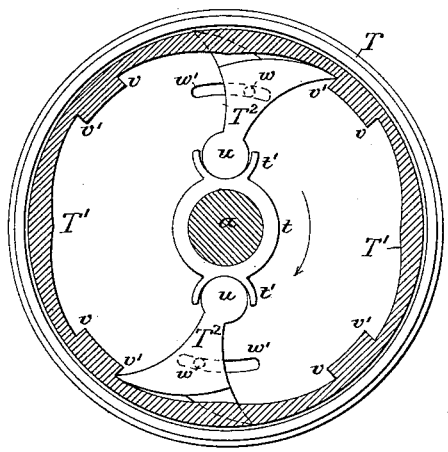
Figure 25:
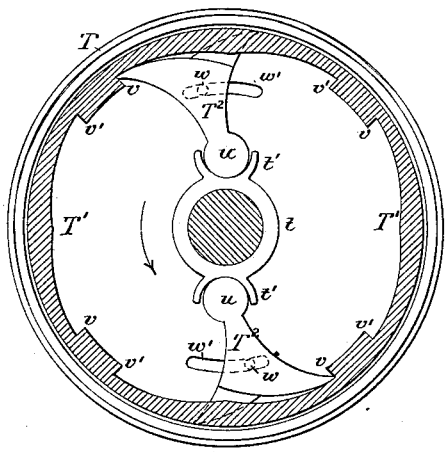

The blast for the supplementary cleaner is derived from the blast-shoe I, in the bottom of which is an opening, $i$, communicating with a tapping-spout, $i'$, and provided with a valve, $i^2$, which when elevated, as shown in Fig. 1, deflects into the spout $i'$ a portion of the air passing through the blast-shoe, the volume of air thus deflected being governed by the adjustment of the valve, which is effected by a handle, $i^3$. The valve has side wings, $i^4$, to prevent the lateral escape of any of the deflected current of air. The end of the tapping-spout $i'$ is curved, as shown in Fig. 19, so as to direct the air into the blast-box $h^5$ of the separator. One end of the shaft $a$, which carries the cylinder, has a reversible pulley (shown in detail in Figs. 23, 24, and 25) capable of being applied to either end of the shaft, so that power can be applied to the shaft at either end. The pulley comprises a drum, T, for receiving a belt, a disk, T', secured to the shaft, and pawls $T^2$, connecting the pulley and disk. These pawls have rounded inner ends, $u$, adapted to recesses $t'$ in the hub $t$ of the pulley, and the disk T' has internal right and left teeth, $v\,v'$, for engagement with the outer ends of the pawls. When the pulley is at one end of the shaft, the pawls are set so as to engage with the right-hand teeth, $v$, as shown in Fig. 25, the parts revolving in the direction of the arrow. When the pulley is applied to the opposite end of the shaft, however, the pawls must be reversed, so as to engage with the left-hand teeth, $v'$, as shown in Fig. 24, for in this case the parts revolve in a direction contrary to that shown in Fig. 25.

To prevent the dropping of the pawls, pins $w$ on the same project through curved slots $w'$ of limited length in the inner shell of the drum T.

I claim as my invention—

1. A thrashing-machine cylinder having bars $b'$, with depressed front edges and hollow rear ribs integral with the bars, as set forth.

2. A thrashing-machine cylinder having bars bent at the rear edges, said bent edges forming hollow ribs integral with the bars, as specified.

3. The combination of the teeth of the concave with the concave-bar having inclined projecting lugs forming beveled seats for said teeth, as specified.

4. The combination of the ribbed teeth of the concave with the concave-bar having projecting lugs forming seats for the teeth and ribbed to correspond therewith, as set forth.

5. The combination of the cylinder, casing, and concave of the machine with the pivoted regulating-plate J, serving as a support for the edge of the concave, as set forth.

6. The combination of the shaking table of a thrashing-machine with hanging devices, each comprising a supporting-lug, $m'$, and a suspending-link, M, having an eye, m, with knife-edge bearing on the top of the lug, and segmental lower bearing for the under side of the lug, as set forth.

7. The combination of the shaking table and the links M, having eyes m, with knife-edge bearings $m^2$, and the recessed lugs $m'$, as specified.

8. The combination of the frame A, the lugs $m'$, the links M, having eyes m, adapted to said lugs, the retaining-plates $m^4$, bearing upon the faces of the lugs and eyes, and the confining-bolts $m^5$ and their nuts, as specified.

9. The combination, in a thrashing-machine, of a cylinder having fan-blades at the end, a fan-box, a grain-bottom, and blast-shoe forming one structure communicating with said fan-box, and means for suspending and reciprocating said structure, as set forth.

10. The combination of the cylinder having fan-blades at the end, a fan-box, a grain-bottom, riddle, and blast-shoe, all forming one structure communicating with the fan-box, and reciprocating and suspending devices for said structure, as specified.

11. The riddle G, having bars, each comprising a table, g, downwardly and rearwardly inclined wing $g'$, and upwardly-projecting and forwardly-bent lip $g^2$, as set forth.

12. The riddle-bar consisting of a single strip of sheet metal bent so as to form the table g, double wing $g'$, and projecting lip $g^2$, as specified.

13. The combination of the grain-bottom, riddle, and blast-shoe with the supplementary cleaner H, the tapping-spout, and the tapping-valve in the blast-shoe, as specified.

14. The combination of the grain-bottom, riddle, and blast-shoe, the supplementary cleaner H, the tapping-spout, and the tapping-valve having side wings, $i^4$, as set forth.

15. The combination, in the cleaner H, of the fan, the blast-shoe, the tapping-spout, the screen $h^2$, box $h^3$, chute $h^4$, and blast-box $h^5$, as set forth.

16. The combination, in the cleaner H, of the fan, the blast-shoe, the tapping-spout, the screen $h^2$, box $h^3$, with side openings, $h^6$, chute $h^4$, and blast-box $h^5$, as set forth.

17. The combination of the end plates of the cylinder, the cylinder-bars adapted to recesses therein, the confining-bands, and the fan-blades secured to said bands, as set forth.

18. The combination of the riddle, the rock-shaft $g^5$, the cam-levers $g^4$, and the brackets $g^8$, curved for adaptation to said levers, as set forth.

In testimony whereof I have signed my name to this specification in the presence of two subscribing witnesses.

JOHN ELLIS.

Witnesses:
HENRY BOSSERT,
HARRY SMITH.